(No Model.)

M. MARTINY.
FIRE ESCAPE.

No. 601,445. Patented Mar. 29, 1898.

Witnesses
J. T. Cross
Chas. E. Brock

Inventor
Mathias Martiny,
by O'Meara & Co.
Attorneys

THE NORRIS PETERS CO., PHOTO-LITHO., WASHINGTON, D. C.

UNITED STATES PATENT OFFICE.

MATHIAS MARTINY, OF DYERSBURG, TENNESSEE.

FIRE-ESCAPE.

SPECIFICATION forming part of Letters Patent No. 601,445, dated March 29, 1898.

Application filed September 8, 1897. Serial No. 650,973. (No model.)

*To all whom it may concern:*

Be it known that I, MATHIAS MARTINY, residing at Dyersburg, in the county of Dyer and State of Tennessee, have invented a new and useful Fire-Escape, of which the following is a specification.

My invention is in the nature of a fire-escape, and has for its object to furnish a cheap, simple, and durable portable device whereby a person may lower himself from an elevated window to the ground with perfect safety.

With this object in view my invention consists in a fire-escape comprising a box or framework, means secured to and depending from the bottom thereof to engage the person of the user, the line extending through an opening in the top of the box or frame and adapted to be secured on the inside of a window or other opening, a transverse shaft pivoted in the framework and provided with a spool upon which said line may be wound, a brake consisting of straps of metal secured to the top of the frame, wrapped once around the shaft and secured to opposite ends of a metal plate or bar below the spool, a lever pivoted inside the box or frame and projecting through one side thereof, and a link connecting the pivoted lever to the plate to which the brake-straps are attached.

In order to enable others skilled in the art to which my invention most nearly appertains to make and use the same, I will now proceed to describe its construction and operation, having reference to the accompanying drawings, forming part of this specification, in which—

Figure 1:
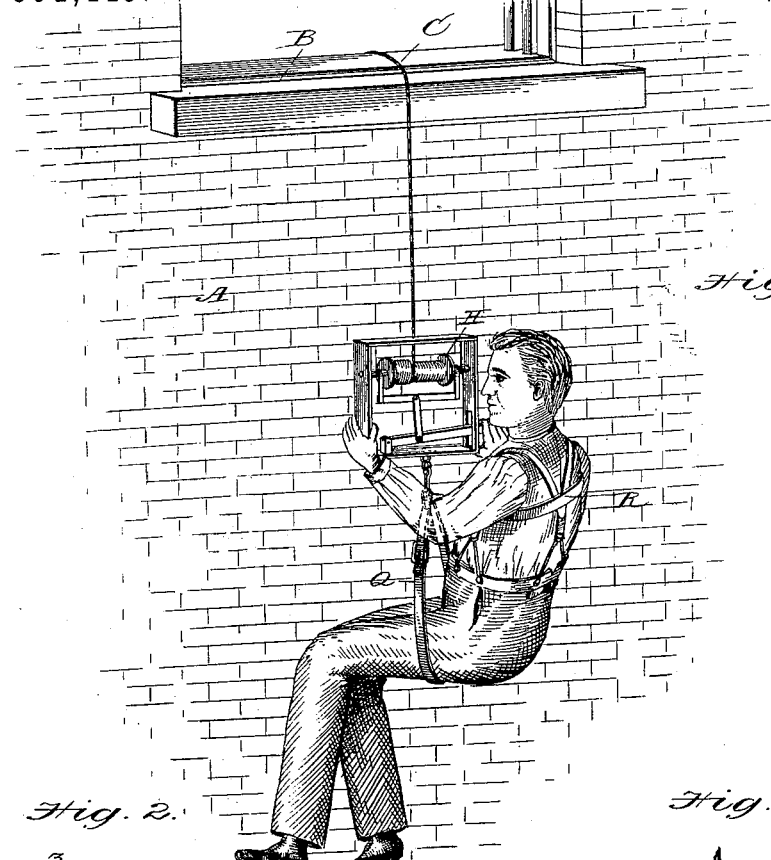
Figure 2:
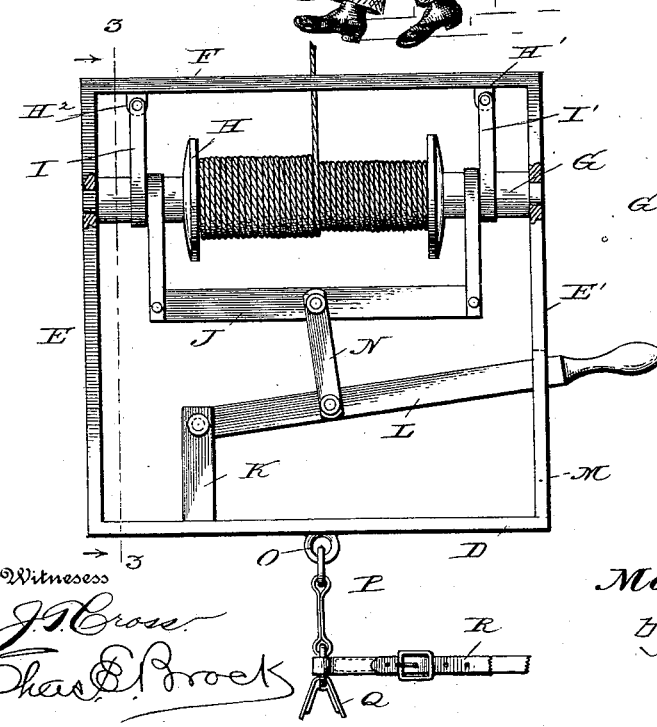
Figure 3:
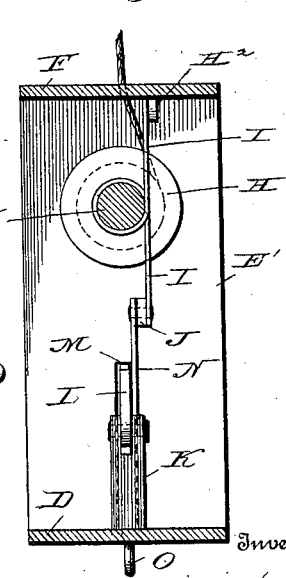

Figure 1 is a perspective view illustrating a fire-escape made in accordance with my invention in practical operation. Fig. 2 is a view in elevation of the same. Fig. 3 is a tranverse vertical section through the same on the line 3 3 of Fig. 2, looking in the direction of the arrows.

Like letters of reference mark the same parts wherever they occur in the various figures of the drawings.

Referring to the drawings by letters, A indicates the wall of a house, and B the sill of a window therein.

C indicates a line, preferably of wire rope, having the outer end thereof secured at some point within the window (not shown) and extending outward and downward.

D is the bottom, E and E' the sides, and F the top of a framework, box, or casing preferably made of metal, the parts being strongly secured together.

G is a shaft journaled in the sides E and E' of the frame, near the top thereof, and provided with a spool H, to which the lower end of the line C is secured and upon which the said line is wound, the line passing through an opening in the top F.

H' and H² are lugs depending from the top F of the frame, to which are secured the upper ends of metallic or other straps I and I', which pass downward, are wrapped once around the shaft G, and at their lower ends are secured to the ends of a metallic bar or plate J.

K is a standard erected upon the bottom D of the framework, in the upper end of which is pivotally secured a lever L, which extends through a vertical slot M in the side E' of the framework and is formed as a handle at its outer end. A link N is pivotally secured at its ends to the bar J and the lever L, as clearly shown in Fig. 2.

Depending from the bottom D of the framework is an eye O, and to this eye is connected, by means of a link P, any suitable means for engaging the body of a person desiring to use the fire-escape. In this instance a loop Q, in which the person may be seated, and a strap R for passing around the back of the person are shown, although a seat of any kind might be used or a belt to fasten securely at the waist.

The operation of my improved device may be described as follows: A person in the room desiring to escape by the way of the window secures the upper end of the line E to any fixed object within the room and seating himself in the loop Q with the strap R at his back throws his weight upon the line and framework, grasping the handle of the lever L in his hand. The weight of the person drawing down upon the framework will cause the line C to be unwound from the spool H, and if no means for retarding the unwinding were provided the person would drop violently to the ground almost as rapidly as if disconnected from this device; but by simply drawing downward or putting a portion of the weight of the person on the handle of the lever L the plate J will be drawn downward, causing the brake-straps I and I' to be wrapped tightly about the shaft G, the effect being to retard the rotation of said shaft and the paying out of the line, so that the descent may be made at any speed desired by the user.

From the foregoing description it will be obvious that I have provided a cheap, simple, and durable means for the purpose intended. In practical operation the casing will be small enough and light enough to be of no encumbrance to the person carrying it. By actual experience I have demonstrated that about seven inches square will be large enough for the casing, which will permit its being packed in a very small package or valise, where it will take up but little room and the parts being made principally of steel will be made very light.

While I have illustrated and described the best means now known to me for carrying out my invention, I wish it to be understood that I do not restrict myself to the exact forms and constructions shown, but hold that any such slight changes or variations as might suggest themselves to the ordinary mechanic will properly fall within the limit and scope of my invention.

Having thus fully described my invention, what I claim as new, and desire to secure by Letters Patent of the United States, is—

1. In a fire-escape, the combination of a box or casing, a shaft journaled in the sides thereof upon which to wind a line, brake-straps depending from the top of the casing and wrapped around the shaft, a plate connecting their lower ends below the shaft, a lever pivoted within the casing and projecting through one side thereof, and a link connecting the plate and lever, substantially as described.

2. The combination in a fire-escape, of a box or framework having an opening in its top and means for securing the person of the user depending from its bottom, a shaft journaled in the sides, a line wound upon said shaft and passing through the opening in the top, lugs depending within the casing from the top thereof, brake-straps secured to said lugs passing downward, around the shaft and below the same, a plate securing their lower ends, a standard erected on the bottom of the casing, a lever pivoted in said standard projecting through a slot in one side thereof and provided with a handle, and a link connecting the plate with the lever, substantially as described.

MATHIAS MARTINY.

Witnesses:
A. R. WOOLLEN,
A. E. MENZIES.